UNITED STATES PATENT OFFICE.

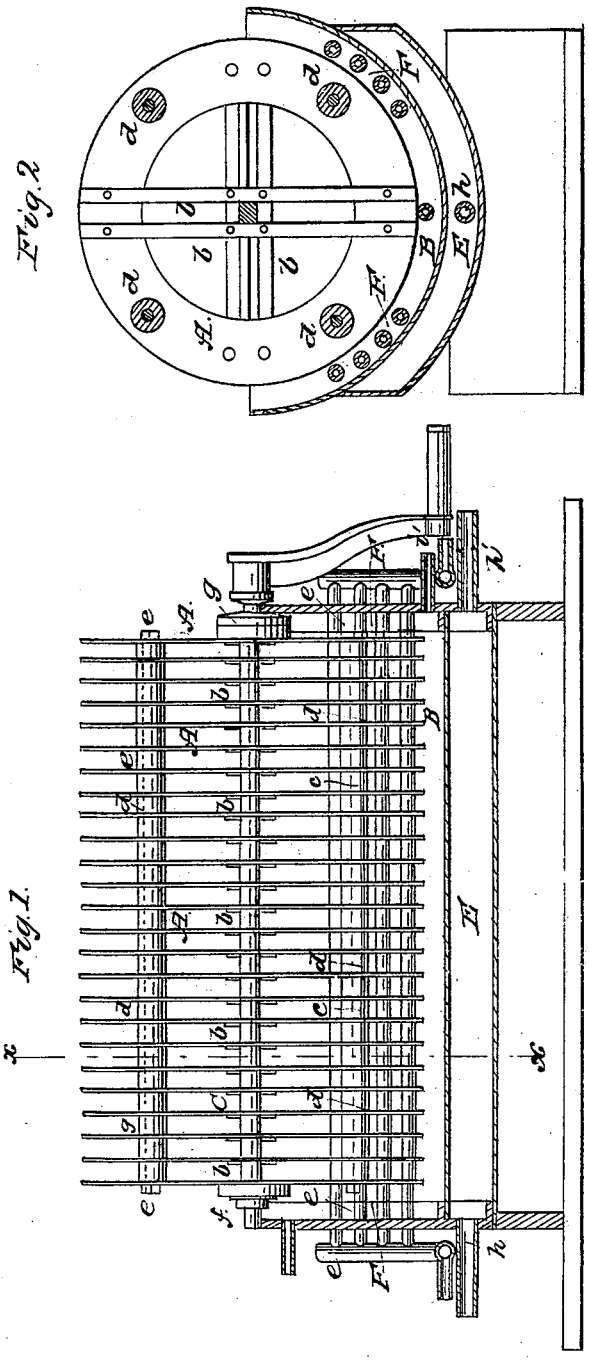

THOMAS OXNARD, OF MARSEILLES, FRANCE.

IMPROVED APPARATUS FOR EVAPORATING LIQUIDS.

Specification forming part of Letters Patent No. 42,789, dated May 17, 1864.

*To all whom it may concern:*

Be it known that I, THOMAS OXNARD, of Marseilles, in the Empire of France, have invented a new and Improved Apparatus for Evaporating Liquids; and I do hereby declare that the following is a full, clear, and exact description of the same, reference being had to the accompanying drawings, forming a part of this specification, in which—

Figure 1 represents a longitudinal vertical section of my invention. Fig. 2 is a transverse vertical section of the same, the line $x$ $x$, Fig. 1, indicating the plane of section.

Similar letters of reference in both views indicate corresponding parts.

This invention relates to an improvement in that class of evaporators in which a series of disks are employed which rotate in a pan heated with steam or any other means, and which take up a portion of the liquid contained in said pan, and by spreading it over a large surface facilitates the evaporation.

The invention consists in the employment or use of annular rims supported by two or more arms, and secured by means of these arms to a rotary shaft which has it bearings in the ends of the pan containing the liquid to be evaporated in such a manner that on rotating said rims a portion of the liquid in the said pan is taken up and caused to drip down through the open space in the center of each rim, where it comes in contact with a current of air passing or being forced through said open spaces, and by these means the operation of evaporating the liquid is considerably facilitated.

To enable those skilled in the art to make and use my invention, I will proceed to describe it.

A series of annular rims, A, are arranged in the interior of a pan, B, on a shaft, C. Each rim is cut or stamped out of sheet-zinc or other suitable material, with a circular space, $a$, in its center, the diameter of which is equal to about three-fifths (more or less) of the outside diameter of the rim. The shaft C is square, and two pairs of flat metal strips, $b$, are riveted or otherwise secured to each rim at right angles to each other, and at such distances apart that they form a square space in the center of the rim to fit the square shaft, as clearly shown in Fig. 1 of the drawings. The rims are steadied by four (more or less) rods, C, which pass through them in a direction parallel to the shaft C, and thick washers $d$, placed on these rods, serve to keep the rims at the proper distances apart. Nuts $e$ on the ends of the rods $c$ serve to tighten up the rims and washers, and a nut, $f$, on one and flange $g'$ on the opposite end of the shaft C confines the whole series of rims and prevents them from moving in a longitudinal direction. By these means thin sheet-metal rims can be fastened to each other and to the shaft C in a convenient and cheap manner, and the flat strips $b$ serve as arms, and at the same time they strengthen and stiffen the rims. Instead of using these strips, however, each rim might be provided with two or more arms, and a central hub with a hole to fit to the shaft C, and the effect would be the same.

The pan B is provided with a steam-jacket, E, which receives its steam and discharges it through pipes $h$ $h'$, and a series of heating-tubes, F, may be made to press in a longitudinal direction through the interior of the pan, so that the liquid in said pan can be heated either by the action of the steam-jacket or by that of the heating-tubes, or by the combined action of both.

Tubes $i$ $i'$ serve to introduce and discharge the liquid to be evaporated. The depth of the liquid in the pan ought not to exceed much the width of the rims A, and after the temperature of the liquid has been raised to the desired point the rims are slowly rotated, and each of them carries up a quantity of liquid and allows it to drip down through the open space $a$, where it is exposed to a current of air passing or forced through the several spaces. By these means the evaporation of the liquid is considerably facilitated, and if my apparatus is employed for evaporating saccharine liquids the evaporation can be effected at a low temperature, and at such a slow speed of the rotary disks as not to interfere with the granulation of the sugar.

What I claim as new, and desire to secure by Letters Patent, is—

The employment or use of a series of annular rims, A, supported by two or more arms, $b$, and secured by means of these arms to a shaft, C, rotating in a pan, B, all constructed and operating in the manner and for the purpose substantially as shown and described.

THOS. OXNARD.

Witnesses:
M. S. PARTRIDGE,
DANIEL ROBERTSON.